United States Patent [19]

Miyasaka

[11] 4,123,679

[45] Oct. 31, 1978

[54] CORELESS CYLINDRICAL ARMATURE FOR ELECTRICAL ROTARY MACHINES

[75] Inventor: Takao Miyasaka, Yokohama, Japan

[73] Assignee: Copal Company Limited, Tokyo, Japan

[21] Appl. No.: 765,104

[22] Filed: Feb. 2, 1977

[30] Foreign Application Priority Data

Feb. 5, 1976 [JP] Japan .................. 51-11760
Apr. 14, 1976 [JP] Japan .............. 51-46526[U]
Apr. 14, 1976 [JP] Japan .............. 51-46527[U]

[51] Int. Cl.² .................................................. H02K 1/22
[52] U.S. Cl. ............................... 310/266; 310/40 MM
[58] Field of Search ............... 310/266, 40 MM, 179, 310/180, 198, 202, 203, 206, 208, 195

[56] References Cited

U.S. PATENT DOCUMENTS

| 3,360,668 | 12/1967 | Faulhaber ................... 310/266 X |
| 3,487,246 | 12/1969 | Long ......................... 310/266 X |
| 3,726,004 | 4/1973 | Holland et al. ............... 310/266 X |
| 4,019,075 | 4/1977 | Kagami ....................... 310/266 X |

FOREIGN PATENT DOCUMENTS

| 673,793 | 6/1952 | United Kingdom ................ 310/266 |
| 1,090,937 | 11/1967 | United Kingdom ................ 310/266 |
| 314,375 | 2/1971 | U.S.S.R. ....................... 310/266 |

*Primary Examiner*—Mark O. Budd
*Attorney, Agent, or Firm*—Cushman, Darby & Cushman

[57] ABSTRACT

The coreless cylindrical armature has a cylindrical coil made of at least one coil unit which includes a plurality of lead wires. Each lead wire traverses at least twice between the peripheral edges of the coil cylinder as it makes one turn around the coil cylinder. The lead wires are regularly spaced angularly of the coil cylinder to provide a full pitch winding that is two layers thick throughout as a result of the winding, but for a respective plurality of apical regions marginally of each peripheral edge of the coil cylinder. Several ultimate dispositions of these apical regions are described.

20 Claims, 23 Drawing Figures

FIG. 1A
PRIOR ART
FIG. 1B
PRIOR ART
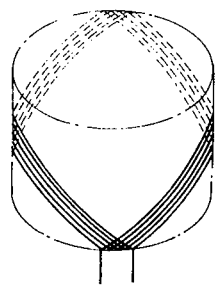
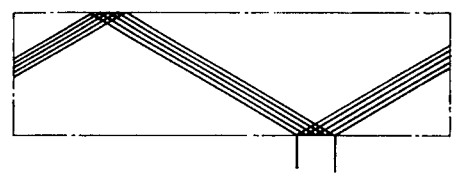
FIG. 2A
PRIOR ART
FIG. 2B
PRIOR ART
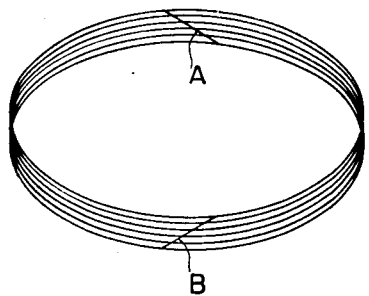
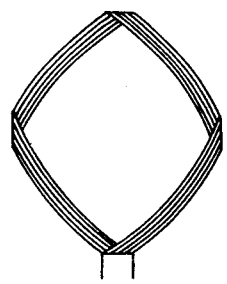
FIG. 3
PRIOR ART
FIG. 4
PRIOR ART
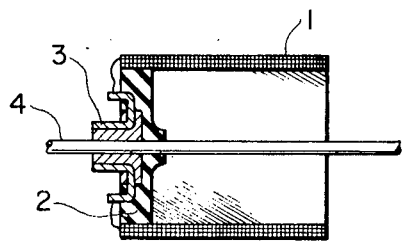
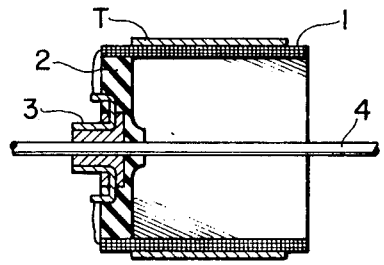

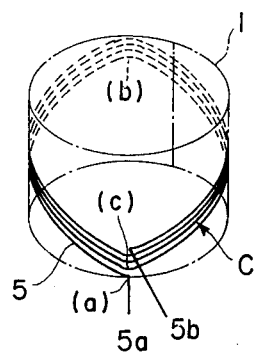
FIG. 5A
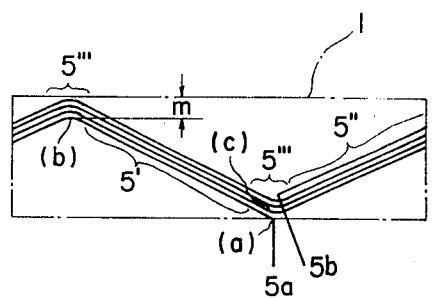
FIG. 5B
FIG. 6
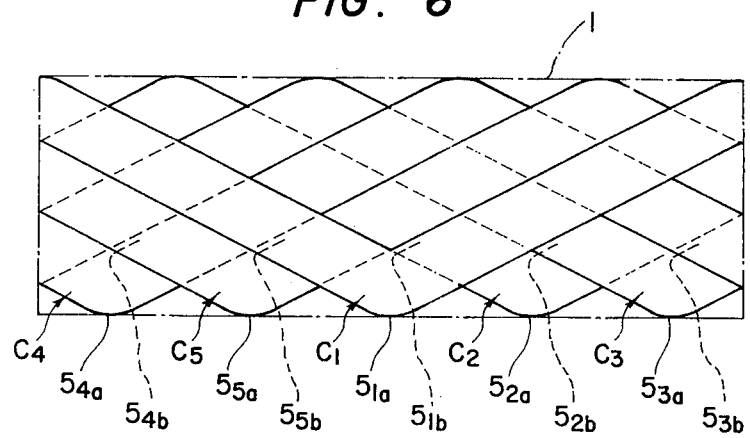
FIG. 7
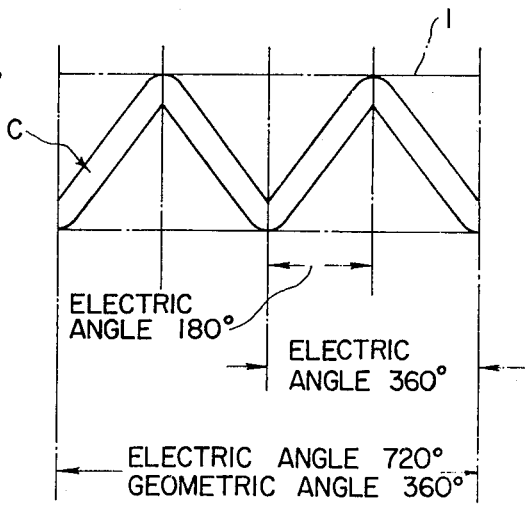

CORELESS CYLINDRICAL ARMATURE FOR ELECTRICAL ROTARY MACHINES

BACKGROUND OF THE INVENTION (a) Field of the Invention

The present invention relates to armatures for electrical rotary machines and more particularly to a cylindrical coreless armature and a process for producing coils for the same.

(b) Description of the Prior Art

A conventional example of a coil unit for a cylindrical coreless armature adapted to an electrical rotary machine provided with a stator having two magnetic poles is shown in FIGS. 1A and 1B. In this conventional example, the coil unit is formed as follows by temporarily providing a cylinder. A lead wire to form the coil first starts at one point on the peripheral edge of the cylinder, extends diagonally upward on the outer peripheral surface, becomes diagonally downward in a position separated by an electric angle of about 180° along the periphery from the above mentioned starting point and comes to be adjacent to the starting point in a position of an electric angle of about 360° to form one turn of the coil. This turn is repeated until the width of the coil unit formed of the lead wire becomes to be of a predetermined value so that one coil unit is formed. The effective length to the actual length of the lead wire can be taken to be so large that this conventional example can be said to be in a coil form high in the rate of utilization of the lead wire.

However, it is very difficult to form a coil unit as mentioned above. In fact, as shown in FIG. 2A, such coil unit as in FIG. 2B is made by a process wherein a lead wire is wound to be in the form of a solenoid and the solenoid is folded back in reverse directions along diagonal fold lines A and B in two positions and a plurality of such coil units are combined to make a cylindrical armature coil. Therefore, in the producing step, particularly the operation of folding back the assembly of the lead wire wound to be in the form of a solenoid is so difficult and the finish fluctuates so much that no uniform coil unit has been always obtained.

Further, the lead wire is wound to be in the form of a solenoid and the solenoid is folded back to be a coil unit. When the lead wire is in the form of a solenoid and when it is finished as a desired coil unit, the front and rear of one portion will be reversed respectively to those of the other portion with each fold line as a boundary. Therefore, a coil of many layers can not be made at once. In order to make a coil unit for many layers, there has been a complicacy that some coil units of one layer different in the diameter are made in advance and must be overlapped.

FIGS. 3 and 4 respectively show two different conventional examples of cylindrical coreless armatures formed by using many coil units made as mentioned above. According to the example in FIG. 3, the armature comprises an armature coil 1 made by cylindrically combining a plurality of coil units and then integrally securing them with a proper binder, a bracket 2 made of such electrically insulating material as a synthetic resin and secured to one open end of the cylindrical armature coil 1 and a rectifier 3 and main shaft 4 secured to the bracket 2. Further, according to the conventional example in FIG. 4, a tape T is wound on the outer peripheral surface of the armature coil 1. Usually, the armature 3 in FIG. 3 is made by bonding the armature coil 1 to the bracket 2 formed integrally with the rectifier 3 or by forming the bracket 2 by holding the relative positions of the armature coil 1 and rectifier 3 in a predetermined state as they are and filling them with a synthetic resin. According to such producing process, generally a binder having a strong bonding force is hard to obtain or the securing force of the resin to the armature coil is so small that the bracket is likely to collapse. There is a defect that, if the area of jointing the resin portion with the armature coil is taken to be wide or such reinforcing tape as in FIG. 4 is used to eliminate such defect, the contour of the entire armature will become larger and the rotary machine itself will have to be larger. Further, there is also a defect that it is difficult to maintain the precision of fitting the armature coil 1 to the main shaft 4.

SUMMARY OF THE INVENTION

A primary object of the present invention is to provide a cylindrical coreless armature of electrical rotary machines which is easy to make and has a sufficient strength though small in the size and a process for producing coil units adapted to the same.

According to the present invention, this object is attained by forming a coil unit of a plurality of first lead wire portions extending over a range corresponding to an electric angle of 180° along the peripheral edge of a coil cylinder on the peripheral surface of the cylinder from one peripheral edge of the cylinder to the other peripheral edge and a plurality of second lead wire portions connected respectively with the first lead wire portions and extending over a range corresponding to a further electric angle of 180° along the peripheral edge of the coil cylinder on the peripheral surface of the cylinder from the above mentioned other peripheral edge of the cylinder to the one peripheral edge.

According to a preferred embodiment of the present invention, a plurality of lead wire portions connecting the first lead wire portions respectively with the second lead wire portions are folded back.

According to another embodiment of the present invention, a thread-shaped or band-shaped reinforcing member is wound on the peripheral edge portion of a coil cylinder.

According to a further embodiment of the present invention, the peripheral edge portion of a coil cylinder is bent inward in the radial direction of the cylinder and the bent portion is secured to a bracket.

A coil unit is made by preparing an even number of core members for winding wires having arcuate surfaces substantially coinciding with the inner peripheral surface of the coil cylinder and relatively movable in the radial directions and the directions rectangular to them and holding members arranged respectively in the positions deflected alternately by a distance corresponding to the width of the coil unit to be made in the radial directions on the arcuate surfaces of these core members, winding lead wires by a plurality of turns on the portions located between the above mentioned holding members on the arcuate surfaces of the core members when these core members for winding wires are respectively moved outward in the radial direction, then, while respectively moving the core members inward in the radial directions to make the plan shape of the assembly of the wound lead wires substantially circular, moving them alternately in the directions rectangular to the radial directions and, when the plan shape of the assembly of the lead wire has become substantially circular, fixing the shape of this assembly.

The coreless cylindrical armature coil and the process for producing coil units for the same according to the present invention have such advantages as are mentioned in the following:

(a) The turns of the lead wire of the coil unit have all the same length and an electromagnetically effective lead wire arrangement is obtained;

(b) By folding back both peripheral edge portions of the coil cylinder, the length of the cylinder can be utilized without wasting it;

(c) A coil cylinder having a thin lead wire arrangement low in the loss of copper can be obtained and the equipment for the production of coil units can be simplified and automated.

BRIEF DESCRIPTION OF THE DRAWINGS

FIG. 1A is a perspective view showing a conventional example of a coil unit used for coreless armatures for electrical rotary machines;

FIG. 1B is a developed view of the coil unit shown in FIG. 1A;

FIG. 2A is a perspective view showing the first step of producing the coil unit shown in FIG. 1A;

FIG. 2B is a perspective view of a conventional coil unit made by folding back the coil shown in FIG. 2A in two positions;

FIG. 3 is a vertically sectioned view showing a conventional example of a coreless armature for electrical rotary machines;

FIG. 4 is a vertically sectioned view showing another conventional example of a coreless armature for electrical rotary machines;

FIG. 5A is a perspective view of a coil unit for cylindrical coreless armatures according to the present invention;

FIG. 5B is a developed view of the coil unit shown in FIG. 5A;

FIG. 6 is a diagrammatic developed view of an armature coil made by combining five coil units according to the present invention;

FIG. 7 is a diagrammatic developed view of a coil unit adapted to an armature of four poles;

DESCRIPTION OF THE PREFERRED EMBODIMENTS

Figure 8:
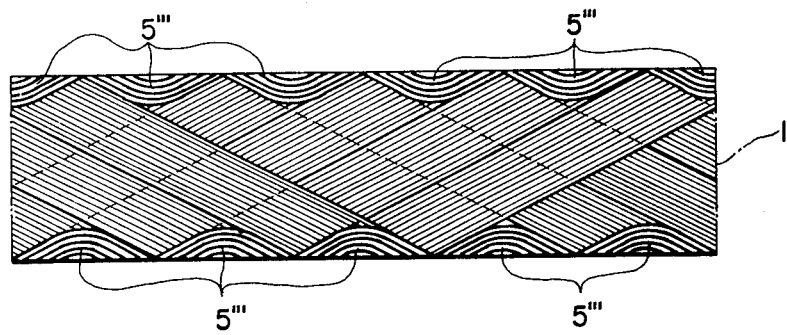
FIG. 8 is a diagrammatic developed view showing both peripheral portions of the armature coil shown in FIG. 6 as folded back.

First, with reference to FIGS. 5A and 5B, it is found that a coil unit C adapted to an armature of two poles is shown there. The coil unit C is formed of an insulated coated electric lead wire 5 whose one end starts at one point (a) on the lower edge of a coil cylinder 1, extends diagonally toward the upper edge on the peripheral surface of the cylinder 1, comes to a point inward of the upper edge by a distance corresponding to the width $m$ of the coil unit C from the upper edge of the cylinder 1 in a position (b) spaced by an electric angle of 180° from the point (a) along the peripheral edge, further extends diagonally towards the lower edge from the upper edge on the peripheral surface of the cylinder from the point (b), comes to a position (c) (just above the starting point (a)) spaced by an electric angle of 360° degrees from the point (a) along the peripheral edge and repeats this several times until the coil width $m$ is reached. The thus formed coil unit C has the width $m$ including a first lead wire portion 5', second lead wire portion 5'' and curved lead wire portion between the first and second lead wire portions and is substantially circular in the plan shape. One end portion 5a and the other end portion 5b of the lead wire 5 are connected respectively to rectifier segments 3 when assembled as an armature.

FIG. 6 is a developed view of the coil cylinder 1 made by combining five coil units C formed as mentioned above. Here, the respective coil units C1 to C5 are briefly shown with only outlines but the connected form of the lead wire of each coil unit is as described with reference to FIGS. 5A and 5B. By the way, the dotted line portions in the drawing show the portions of the coil units to be underneath as seen from outside the coil cylinder 1. In this embodiment as clear in the drawing, in the arrangement of five coil units, the coil unit C2 is positioned most inside, the coil units C3, C4 and C5 are arranged outside in turn and the coil unit C1 is arranged most outside. In the thus formed coil cylinder 1, the winding beginning end portions $5_{1a}$ to $5_{5a}$ and the winding ending end portions $5_{1b}$ to $5_{5b}$ are respectively connected, for example, as in $5_{1b}$ with $5_{2a}$, $5_{2b}$ with $5_{3a}$, $5_{3b}$ with $5_{4a}$, . . . , $5_{5b}$ with $5_{1a}$ and the respective connected portions are connected respectively with the five separated rectifier segments.

The coil units for armatures adapted to electrical rotary machines each having a stator of two poles have been explained in the above. In order to obtain coil units adapted to electrical rotary machines each having a stator of four poles, as in the developed view shown in FIG. 7, the lead wire arrangement over an electric angle of 360° determined as described above may be repeated twice within a peripheral range over a geometric angle of 360°. It will be apparent that, if such repetition is further increased, coil units adapted to electrical rotary machines each having a stator of more poles will be able to be obtained.

Further, as apparent from FIG. 6, the respective coil units are doubled so as to mostly traverse overlap with each other but the upper and lower apex portions, that is, the lead wire portions 5''' are folded back, fixed and shaped as shown in FIG. 8, the coil cylinder will become dimensionally equal to the conventional coil cylinder and will additionally have the following advantages. That is to say, in the portion in which the lead wires are overlapped by folding back the lead wire portions 5''' as in FIG. 8, the directions of the current flowing through the lead wire located on the upper side and the lead wire located on the lower side will become reverse to each other. As a result, the magnetic actions will be canceled with each other and therefore said portion will not be substantially utilized. This lead wire overlapping portion can not help being formed only of linear lead wire portions in the conventional example, whereas, in the case of the present invention, it includes arcuate lead wire portions and therefore the lead wire portions in the unutilized portion are so short that the loss of copper can be reduced.

By the way, in consideration of the securing, mechanical strength and thinning of the lead wires with each other and in the above mentioned folded back portions 5''', it is preferable to use self-fusing wires or the like.

The armature coil of the present invention is formed by such effective lead wire arrangement as in the above. Further, its advantage is that the lead wire arrangement can be obtained by such simple producing process as is described below, because the length of one turn of the lead wire until the lead wire as measured from a point comes again near to the point is the same anywhere on the coil unit C.

Figure 9:
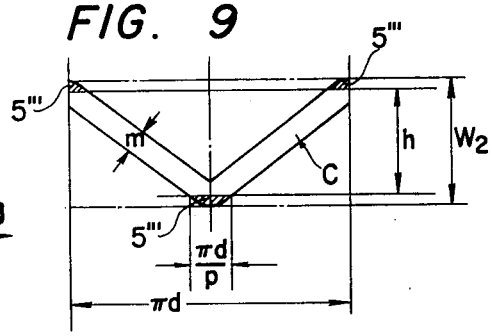
FIG. 9 is a diagrammatic developed of a coil unit adapted to an armature of two poles.

FIG. 9 is a view quantitatively showing the lead wire arrangement. It is shown of an armature coil to be used for electrical rotary machines in which the diameter of the coil cylinder 1 is represented by $d$, the length of the coil cylinder after the lead wire portions 5''' of the coil unit C are folded back is represented by $h$, the number of the coil units is represented by $p$ and the number of magnetic poles is 2. Further, the hatched portions in the drawing show portions to be folded back as described above. Here, when the length of one turn of the lead wire 5 is represented by L, the width of the coil unit C is represented by $m$ and $m$, L and W2 (length of the coil cylinder before the folding back) are determined, $$m = \frac{\pi d}{p} \times \frac{h}{\sqrt{(\pi p/2)^2 + h^2}},$$

$$L = \frac{\pi d}{\cos(\tan^{-1}\frac{h}{\pi d/2})} + 4\pi m \frac{(\tan^{-1}\frac{h}{\pi d/2})}{360} - \frac{2mh}{\pi d/2},$$

and $$W2 = h\{(1 - \frac{2}{p}) + \frac{2\pi d/p}{(\pi d/2)^2 + h^2}\}$$

will be obtained. Therefore, the size and dimensions of the coil unit C can be determined by these formulas.

By the way, it is needless to say that, in case the number of the magnetic poles is represented generally by $n$, $\pi d$ may be considered as $\pi d/(n/2)$ in the above mentioned formulas.

Figure 10A:
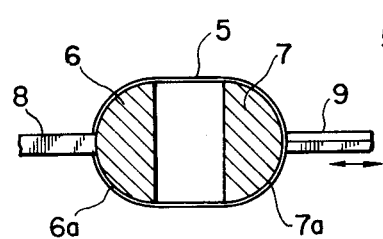
FIG. 10A is a plan view showing an embodiment of an apparatus for producing coil units according to the present invention.
Figure 10B:
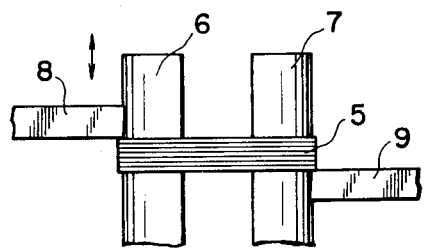
FIGS. 10B and 10C are side views of FIG. 10A as seen in the respective directions different from each other.

An embodiment of the process for producing coil units according to the present invention shall be explained in the following with reference to FIGS. 10A, 10B, 10C and 10D. Reference numerals 6 and 7 respectively indicate core members for winding wires having arcuate outer peripheral surfaces 6a and 7a of radii substantially equal to the inside radius of the desired coil cylinder 1 and arranged movably in the radial directions (the directions indicated by the arrows in FIG. 10A) and axial directions (the directions indicated by the arrows in FIG. 10B) so that the arcuate outer peripheral surfaces 6a and 7a may form a cylindrical peripheral surface when the core members 6 and 7 are assembled. Reference numerals 8 and 9 respectively indicate holding members which can be fixed on the peripheral surfaces of the core members 6 and 7 and are separated from each other by a proper distance, that is, a distance corresponding to the width $m$ of the coil unit to be made. A lead wire 5 is closely wound in a space formed by the holding members 8 and 9 on the arcuate outer peripheral surfaces 6a and 7a respectively of the core members 6 and 7. First of all, the core members 6 and 7 are moved and arranged radially outward so that the sum of the lengths of the arcs of the respective arcuate outer peripheral surfaces and the length twice as large as the distance between both core members may be equal to the length L of one turn of the lead wire. In this state, the lead wire 5 is wound closely so that the width $m$ may be obtained on the portion between the holding members 8 and 9 on the arcuate outer peripheral surfaces of the core members 6 and 7. This state is shown in FIG. 10B. Such wire winding operation can be easily made by the already existing technique.

Figure 10C:
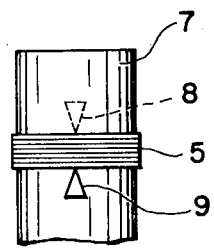

The holding members 8 and 9 perform a role of holding the lead wire wound on the core members 6 and 7 as fixed at one point as shown in FIG. 10C but, when the lead wire is wound, it needs not always be fixed in the illustrated position but may be fixed and arranged in the illustrated position at least in the final step of winding it. By the way, though omitted in the drawing, the beginning end 5a and ending end 5b of the lead wire 5 must be positioned near either one of the holding members.

Figure 10D:
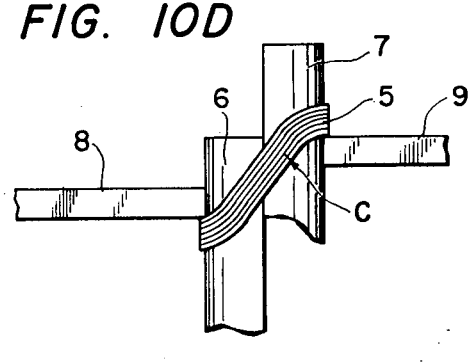
FIG. 10D is the same side view as in FIG. 10B, showing the final step of producing coil units.

When the core members 6 and 7 are then relatively moved in the directions indicated by the arrows in FIG. 10B, they will move also in the direction of approaching each other as a result and will be finally in such state as is shown in FIG. 10D. It will be easily understood that the lead wire 5 will be elliptic in the plan shape in the state in FIG. 10A but will be substantially truly circular in the plan shape in the state in FIG. 10D and that the group of lead wires 5 will be in the form of the required coil unit C.

In case such electric wire as a so-called self-fusing wire is used for the lead wire 5, it will be coated with a necessary solvent or will be heated or otherwise treated. Further, in case such ordinary insulated electric wire as, for example, an enameled copper wire provided by JIS (Japanese Industrial Standards) is used, a binder penetrating into the narrow clearance between the adjacent lead wires and having a function of intercepting moisture or air will be used to fix the adjacent lead wires with each other so that the group of lead wires 5 may be fixed in the form of the coil unit C. In this state, the form will not vary. Therefore, if the holding members 8 and 9 are removed by a proper means and then the group of lead wires 5 is pulled off the core members 6 and 7, the coil unit C will be obtained.

In order to obtain the coil cylinder 1 by combining a required number of the thus obtained coil units, for example, the coil units are overlapped while being deflected by a predetermined angle to cover the outer periphery of a column having a diameter substantially equal to the diameter of the above mentioned core members when assembled, are pressed from outside with a device having a hollow portion having an inside diameter substantially equal to the outside diameter of the coil cylinder 1 and may be respectively secured between them in this state by the same means as was used to fix the above described lead wires or by molding or the like.

Figure 11:
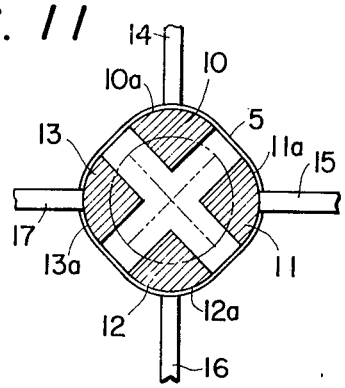
FIG. 11 is the same plan view as in FIG. 10A, showing an apparatus for producing coil units adapted to an armature coil of four poles.
Figure 12:
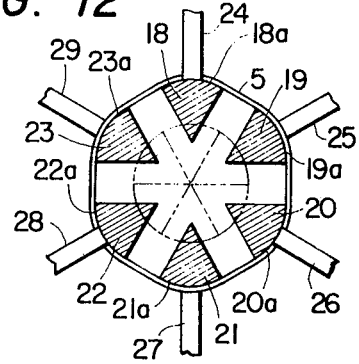
FIG. 12 is the same plan view as in FIG. 10A, showing an apparatus for producing coil units adapted to an armature coil of six poles.

FIGS. 10A, 10B, 10C and 10D show a concrete example of a process for producing armature coils adapted to electrical rotary mechines each having two magnetic poles of an electric angle equal to a geometric angle. In order to obtain a coil unit for four poles or six poles, as shown in FIGS. 11 or 12 (corresponding to FIG. 10A), the core member 10, 11, 12 and 13 or core members 18, 19, 20, 21, 22 and 23 and the holding members 14, 15, 16 and 17 or holding members 24, 25, 26, 27, 28 and 29 may be increased and set in response to the number of poles. The same as is described above, the respective holding members are arranged as alternately stepped, the lead wire 5 is wound on the arcuate outer peripheral surfaces 10a, 11a, 12a and 13a or 18a, 19a, 20a, 21a, 22a and 23a between the stepped holding members and the respective core members are moved inward in the radial directions while being moved alternately in the vertical directions (in the directions indicated by the arrows in FIG. 10B) to obtain a coil unit for four or six poles.

By the way, the holding member in the above described embodiment is in the form of bar of a triangular cross-sectional shape and is to vertically fix the wound wire group at only one point. However, it is possible to adopt a fixing method wherein the outside surface of the wound wire group is pressed against the core member with a very small width or a method wherein, in the step of forming the required final shape of the coil unit with the movement of the core members, all or a required portion of the lead wire group is pressed in turn in cooperation with the core members.

Figure 13:
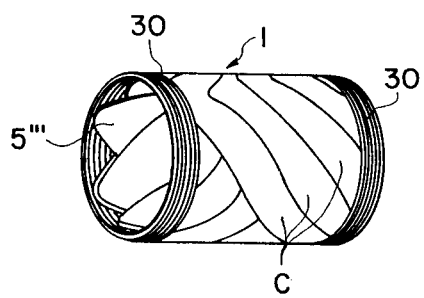
FIG. 13 is a perspective view showing an embodiment of an armature coil according to the present invention.
Figure 14:
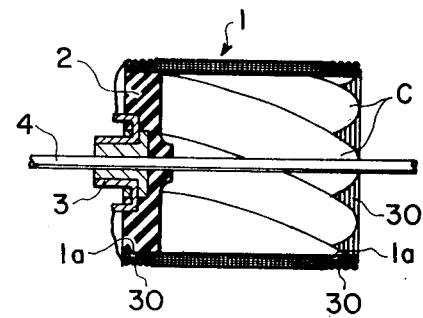
FIG. 14 is a vertically sectioned view of a coreless armature including the coil shown in FIG. 13.

An embodiment of the armature or coil cylinder 1 according to the present invention is shown in FIG. 13. According to this embodiment, the coil cylinder 1 is formed by combining seven coil units C as described above and a thread-shaped or band-shaped reinforcing member 30 impregnated with a binder or the like having as a main agent such thermosetting resin as an epoxy resin is wound on the outer periphery of each edge portion of the coil cylinder 1, that is, on the outside of the portion formed of the lead wire portions 5''' of the respective coil units. When heated, this reinforcing member 30 will be hardened integrally with the respective lead wires and coil units through the binder. A coreless armature including the thus obtained coil cylinder is shown in FIG. 14. According to this embodiment, a binder having as a main agent an epoxy resin high in the heat-proofness is used as a means of securing the reinforcing member 30 to the coil cylinder 1 so that armature coils generally high in the heat-proofness may be obtained. Further, in case a thread-shaped body is used as a reinforcing member, there will be an advantage that the treatment of the end of the thread will be so easy that the operation of winding the reinforcing member will be easy.

Figure 15:
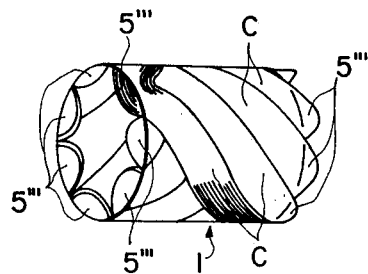
FIG. 15 is a perspective view showing another embodiment of an armature coil according to the present invention.
Figure 16:
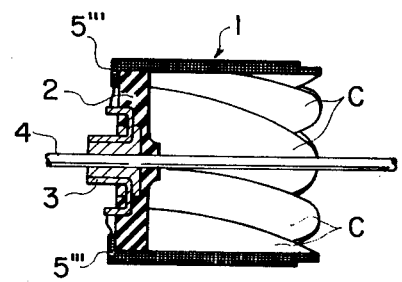
FIG. 16 is a vertically sectioned view showing an embodiment of a coreless armature including the coil shown in FIG. 15.
Figure 17:
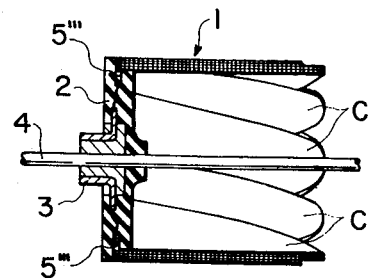
FIG. 17 is a vertically sectioned view showing another embodiment of a coreless armature including the coil shown in FIG. 15.

FIG. 15 shows another embodiment of the armature coil or coil cylinder 1 according to the present invention. According to this embodiment, the coil cylinder 1 is formed by combining a plurality of coil units C in the same manner as is described above and one edge portion of the coil cylinder 1, that is, the lead wire portions 5''' of the respective coil units are bent at right angles inward in the radial directions of the coil cylinder 1. Two different embodiments of coreless armature including the thus obtained coil cylinders 1 are shown respectively in FIGS. 16 and 17. That is to say, in the embodiment in FIG. 16, the bent lead wire portions 5''' are bonded to the outside end surface of the bracket 2 and, in the embodiment in FIG. 17, the bracket 2 is formed by a so-called molding wherein the relative positions of the main shaft 4, rectifier 3 and coil cylinder 1 are predetermined and are filled with a synthetic resin or the like and the bent lead wire portions 5''' are embedded in the bracket 2. In such case, if the respective coil units are prepared with the lead wire portions 5''' bent in advance, the production of the coil units will be easy.

I claim:

1. A coreless armature for an electrical rotary machine, comprising:
   a main shaft;
   a bracket secured to said main shaft;
   a rectifier secured to said bracket; and
   a coil cylinder having two opposed peripheral edges bounding a peripheral surface and including therein at least one coil unit connected at respective connections with said rectifier,
   characterized in that
   said coil unit comprises:
   a plurality of first lead wire portions, $n$ in number, each extending on said peripheral surface over a range corresponding to a respective first electrical angle of 180° from along one peripheral edge of said cylinder toward the other peripheral edge thereof;
   a respective plurality of second lead wire portions each extending on said peripheral surface over a range corresponding to a respective further, second electrical angle of 180° from along said other peripheral edge of said cylinder toward said one peripheral edge thereof;
   each first lead wire portion joining and forming with each respective second lead wire portion a respective continuous lead wire which extends completely circumferentially of said peripheral surface;
   the first through $n$th such lead wires being regularly distributed in a circular series angularly of said peripheral surface;
   each first lead wire portion being connected to the respective second lead wire portion of the respective angularly next lead wire in said circular series, thereby forming a said connection, each such connection being connected to said rectifier;
   the breadth of each lead wire being such as to provide, complementarily with
   each lead wire being sufficiently broad, angularly of said peripheral surface, that all of said lead wires, considered together, provide a full pitch, substantially completely double-layer winding, excepting at a respective plurality of relatively axially short apical regions at each peripheral edge of said cylinder, typically where a respective first lead wire joins a respective second lead wire, where should each such region not be bent double upon itself along a generally circumferentially extending axis intermediate the axial extent thereof longitudinally of said cylinder the winding remains of single layer.

2. The coreless armature of claim 1, wherein:
   for each turn of each said lead wire fully about the circumference of said cylinder, that respective lead wire regularly traverses between said peripheral edges but twice.

3. The coreless armature of claim 1, wherein:
for each turn of each said lead wire fully about the circumference of said cylinder that respective lead wire regularly traverses between said peripheral edges four times.

4. The coreless armature of claim 1, wherein:
for each turn of each said lead wire fully about the circumference of said cylinder that respective lead wire regularly traverses between said peripheral edges six times.

5. The coreless armature of claim 1, wherein:
each lead wire is constituted by a plurality of turns extending in a tape-like single layer.

6. The coreless armature of claim 1, wherein:
marginally of at least one peripheral edge of said cylinder, each such apical region is doubled over upon itself about the respective said generally circumferentially extending axis, to double in thickness said winding in each apical region so doubled over.

7. The coreless armature of claim 1, further comprising:
a circumferentially extending reinforcing member superimposed upon said coil cylinder marginally of one peripheral edge of said coil cylinder, and covering each said apical region of said one peripheral edge throughout at least a portion of the axial extent of each such apical region longitudinally of the coil cylinder.

8. The coreless armature of claim 7, wherein:
the reinforcing member is constituted by a thread-shaped element wound circumferentially about the coil cylinder.

9. The coreless armature of claim 7, wherein:
the reinforcing member is constituted by a band-shaped element wound circumferentially about the coil cylinder.

10. The coreless armature of claim 1, wherein:
marginally of one peripheral edge of said cylinder, each such apical region is bent so that it extends, in a tab portion thereby defined, radially of said cylinder from the respective said generally circumferentially extending axis;
each said apical region tab portion being secured to said bracket.

11. The coreless armature of claim 10, wherein:
said tab portions are secured to said bracket by being embedded therein.

12. A coil unit for providing a coreless armature for an electrical rotary machine, comprising:
a coil cylinder having two opposed peripheral edges bounding a peripheral surface and including therein at least one coil unit for connection at respective connections with a rectifier of the electrical rotary machine,
characterized in that said coil unit comprises:
a plurality of first lead wire portions, $n$ in number, each extending on said peripheral surface over a range corresponding to a respective first electrical angle of 180° from along one peripheral edge of said cylinder toward the other peripheral edge thereof;
a respective plurality of second lead wire portions each extending on said peripheral surface over a range corresponding to a respective further, second electrical angle of 180° from along said other peripheral edge of said cylinder toward said one peripheral edge thereof;
each first lead wire portion joining and forming with each respective second lead wire portion a respective continuous lead wire which extends completely circumferentially of said peripheral surface;
the first through $n$th such lead wires being regularly distributed in a circular series angularly of said peripheral surface;
each first lead wire portion being connected to the respective second lead wire portion of the respective angularly next lead wire in said circular series, thereby forming a said connection, each such connection being for connection to said rectifier;
the breadth of each lead wire being such as to provide, complementarily with
each lead wire being sufficiently broad, angularly of said peripheral surface, that all of said lead wires, considered together, provide a full pitch, substantially completely double-layer winding, excepting at a respective plurality of relatively axially short apical regions at each peripheral edge of said coil cylinder, typically where a respective first lead wire joins a respective second lead wire, where should each such region not be bent double upon itself along a generally circumferentially extending axis intermediate the axial extent thereof longitudinally of said cylinder the winding remains of single layer.

13. The coil cylinder of claim 12, wherein: for each turn of each said lead wire fully about the circumference of said cylinder, that respective lead wire regularly traverses between said peripheral edges but twice.

14. The coil cylinder of claim 12, wherein:
for each turn of each said lead wire fully about the circumference of said cylinder that respective lead wire regularly traverses between said peripheral edges four times.

15. The coil cylinder of claim 12, wherein:
for each turn of each said lead wire fully about the circumference of said cylinder that respective lead wire regularly traverses between said peripheral edges six times.

16. The coreless armature of claim 12, wherein:
each lead wire is constituted by a plurality of turns extending in a tape-like single layer.

17. The coil cylinder of claim 12, wherein:
marginally of at least one peripheral edge of said cylinder, each such apical region is doubled over upon itself about the respective said generally circumferentially extending axis, to double in thickness said winding in each apical region so doubled over.

18. The coil cylinder of claim 12, further comprising:
a circumferentially extending reinforcing member superimposed upon said coil cylinder marginally of one peripheral edge of said coil cylinder, and covering each said apical region of said one peripheral edge throughout at least a portion of the axial extent of each such apical region longitudinally of the coil cylinder.

19. The coil cylinder of claim 18, wherein:
the reinforcing member is constituted by a thread-shaped element wound circumferentially about the coil cylinder.

20. The coil cylinder of claim 18, wherein:
the reinforcing member is constituted by a band-shaped element wound circumferentially about the coil cylinder.

* * * * *